United States Patent Office 3,006,909
Patented Oct. 31, 1961

3,006,909
PRODUCTION OF SOLID POLYETHYLENE WITH ZIRCONIUM OXIDE, SILICA-ALUMINA CATALYSTS
Donald R. Witt, Bartlesville, Okla., assignor to Phillips Petroleum Company, a corporation of Delaware
No Drawing. Filed Sept. 13, 1957, Ser. No. 683,708
8 Claims. (Cl. 260—94.9)

This invention relates to the production of solid polymer materials. In one aspect, the invention relates to a process for polymerizing ethylene in the presence of a catalyst which is novel for this purpose. In another aspect, the invention relates to new polymers. In still another aspect, the invention relates to the production of catalysts.

The polymers produced according to this invention are thermoplastic, normally solid materials. They are useful for those applications known for polyethylene in general, such as the production of molded articles such as containers for liquids. The polymers can be extended to form rods, pipes, tubes, or sheets. They can also be fabricated into films (by rolling, inflating or extruding) which are useful for the packaging of foods, drugs, and other articles and materials. The polymers can be added to other polymers such as natural and synthetic rubber, polystyrene, and polyethylenes made by other methods, in order to impart desired properties to these materials.

It is an object of this invention to provide a useful and new process for the production of solid polymers of ethylene.

It is also an object of this invention to provide a novel process for the polymerization of ethylene to form solid polymers.

Other objects and advantages of this invention will become apparent to those skilled in the art upon studying the disclosure of the invention.

According to this invention, ethylene is polymerized to form a solid polymer by contacting the ethylene with a catalyst comprising zirconium oxide associated with silica and alumina.

The catalyst for the process generally contains a minor proportion of zirconium oxide, and the zirconium oxide content is ordinarily in the range of about 1 percent by weight of the total finished catalyst to about 10 weight percent or more. The material with which the zirconium oxide is associated is preferably a silica-alumina composite of the type generally utilized as a catalyst in the prior art of catalytic cracking. This composite can be produced by any of the methods known in the prior art, e.g., coprecipitation, deposition of silica on alumina, or vice versa, or by the acid treatment of certain naturally occurring silicates such as clays. A highly satisfactory material is a coprecipitated gel comprising a major proportion of silica and a minor proportion of alumina. The silica, as a portion of the silica plus alumina, can range from 5 to 99 percent, and is preferably from about 80 to about 95 percent. A large variety of silica-alumina composites of this general type is available on the market and well known to those skilled in the art. The zirconium oxide can be associated with the silica-alumina in any desired manner. For example, the silica-alumina composite can be milled in a ball mill together with a granular solid zirconium oxide. Alternatively, the zirconium oxide can be coprecipitated with the silica-alumina composite. A method which has been found highly satisfactory for the preparation of the catalyst according to this invention comprises depositing a zirconium compound calcinable to zirconium oxide (e.g., zirconyl nitrate, zirconium nitrate, zirconyl chloride, or zirconium acetate) on a preformed silica-alumina composite and subsequently heating the resulting composite. In one embodiment, the catalyst can be prepared by impregnating the silica-alumina composite with an aqueous solution of a zirconium salt calcinable to zirconium oxide, draining off excess liquid, drying the resulting compounds, e.g., at temperatures in the range 200 to 350° F., and subsequently heating the dried composite, preferably under non-reducing conditions. The heating step following the drying can be conducted at a temperature in the range from about 250 to 1500° F. and is preferably conducted in a vacuum or in a non-reducing atmosphere such as nitrogen, helium, argon, carbon dioxide, oxygen or air. Hydrogen, carbon monoxide, or other reducing gases can be present, but if these are present the temperature and time should be limited so that reduction of all of the zirconium oxide is not attained. It is generally preferred that the heating step be conducted in the presence of an oxidizing gas such as oxygen or air and that the atmosphere be substantially dry, i.e., that it have a dew point below about 0° F. A preferred range of activation temperature is from about 700 to about 1500° F. The time of heating is regulated to obtain a substantial increase in the activity of the catalyst. Ordinarily, the time of heating is in the range of from about 30 minutes to 50 hours or longer. Time and temperature of heating are intimately related so that shorter times are effected at higher temperatures and longer times are required at lower temperatures. In most cases, the time of heating is in the range from about 1 to about 10 hours.

The polymerization is generally conducted at a temperature below about 550° F. Ordinarily, the polymerization is conducted at the temperature from about 150 to about 550° F. and preferably from about 200 to about 400° F. Pressures are ordinarily superatmospheric and are most suitable up to 500 p.s.i., although higher pressures can be used where desired. Pressures in the range of 100 to 500 p.s.i. are generally preferred. The ethylene can be present in the reaction zone in the gaseous phase with or without a diluent or solvent. In many cases it is desirable to use a diluent which is liquid and inert under the conditions of polymerization, the pressure being maintained at a sufficiently high value to maintain the diluent substantially in the liquid phase. The reactor can be operated liquid-full, all of the ethylene being dissolved in the diluent. It is often preferable, however, to maintain a gas phase, comprising chiefly ethylene, in contact with the liquid in the reactor. This type of operation facilitates efficient reaction and maintenance of a steady supply and concentration of ethylene in the reactor. It also facilitates pressure and concentration control.

The diluent or solvent used can be any material which is inert and non-deleterious under the reaction conditions. Preferably, the diluent is a hydrocarbon and more preferably it is a hydrocarbon selected from the group consisting of paraffinic cycloparaffinic hydrocarbons. However, aromatic hydrocarbons can be used if desired. Specific diluents which can be used are methane, ethane, propane, normal butane, isobutane, normal pentane, isopentane, normal hexane, the isohexanes, normal heptane, the isoheptanes, normal octane, and the isooctanes, e.g., 2,2,4-trimethylpentane. The nonanes, the decanes, the undecanes, and the dodecanes, are also useful. Other suitable diluents are cyclopentane, methyl cyclopentanes, the di-methyl cyclopentanes, cyclohexane, methyl cyclohexane, and the di-methyl cyclohexanes. When a paraffinic hydrocarbon is used, it is preferred that it contain from 3 to 12 carbon atoms per molecule since these paraffins can readily be liquefied under reaction conditions. Under certain circumstances, the cycloparaffins are preferred diluents on account of their relatively high solvent power for the product polymers.

The technique of contacting the hydrocarbon feed with the catalyst can vary, depending upon the results desired. Fixed-bed contacting can be utilized, as can mobile catalyst techniques. Contacting with a fluidized or suspended catalyst, with the hydrocarbon feed in the liquid or gaseous phase is within the scope of the invention. Thus a satisfactory technique comprises suspending the catalyst (e.g., 20–70 mesh or finer) in the liquid diluent to form a slurry or suspension containing, for example from 0.1 to 30 weight percent of catalyst, feeding such a suspension or slurry to the reaction zone, simultaneously supplying a gaseous stream of ethylene, agitating the mixture of ethylene, diluent and catalyst within the reaction zone, withdrawing an effluent, heating the effluent to a temperature from 10 to 50 degrees higher than that in the reaction zone in order to effect complete solution of the polymer in the solvent, filtering to remove catalyst, recovering a filtrate, and recovering the dissolved polymer from the filtrate by vaporizing the solvent or diluent or by cooling the solution to precipitate the polymer and recovering the precipitated polymer. When fixed-bed contacting is used the space velocity is generally in the range from about 1 to about 20 liquid volumes of feed per volume of catalyst per hour. When a suspended catalyst technique is used, the residence time of the ethylene in the reaction zone is usually from about 15 minutes to about 10 hours.

Methods for recovering the polymer can vary, depending upon the method of catalytic contacting utilized and upon the desired use to which the polymer is to be put. Thus, when fixed bed contacting is used, the effluent from the reaction zone can be processed for the production of light polymer and the contacting of feed at a given mass of catalysts can be interrupted from time to time to remove adhering polymer from the catalyst surface. This removal can be accomplished by the use of a hot solvent such as a hydrocarbon of the type already referred to as being suitable as diluents in the polymerization. This removal is ordinarily accomplished at a temperature above that used for the polymerization. The removed heavy polymer fraction can then be recovered from solution in the solvent. When a mobile catalyst is utilized, the effluent from the reaction zone contains catalyst. Whether the catalyst is to be removed depends upon, among other things, the intended use of the polymer. In some cases, the final polymer is used for purposes which do not preclude the presence of relatively small amounts of solid catalyst. In such cases, the complete removal of catalyst is unnecessary. Where a polymer which contains no inorganic impurities is desired, removal of the catalyst is necessary. One method for removing the catalyst has already been described. Removal of polymer from admixture with solvent hydrocarbons can be accomplished by methods already known. Thus, the solvent can be removed from admixture with the polymer by vaporization or the solution can be cooled to precipitate the polymer which can then be recovered by filtration or similar methods.

While the invention has been described chiefly in connection with the homopolymerization of ethylene to form solid polyethylene, minor amounts of other olefinic material copolymerizable with ethylene can be present in the feed. Thus ethylene can be copolymerized with a relatively minor amount of propylene, 1-butene, 1-pentene, or 1,3-butadiene. Ordinarily the compound heavier than ethylene is present in minor amount, based on the total olefin. Preferably, the heavier olefin is present in an amount from about 0.5 to about 20 weight percent, based on total olefin. Higher amounts tend to produce a polymer containing undesirably large amounts of liquid polymer.

The following specific embodiment of the invention will be helpful in understanding the invention but it is to be understood that it is exemplary and not limiting upon the invention.

A catalyst was prepared by impregnating a silica-alumina gel cracking catalyst (silica-alumina ratio, 9:1) with an aqueous solution of zirconyl nitrate, $$ZrO(NO_3)_2 \cdot 2H_2O$$

and the excess solution filtered off. The catalyst was dried and activated in a stream of air at 950° F. for 5 hours. A test run of 2 hours duration was carried out batchwise in a stirred reactor with cyclohexane as the solvent and with continuous addition of ethylene to maintain pressure. The operating temperature was 270° F. and the pressure was 450 p.s.i.g. A second run with silica-alumina as the catalyst was carried out under the same conditions but was of 4 hours duration.

Results of these tests are tabulated below:

*Table 1*

| Run No. | Catalyst | Grams of catalyst charged | Grams of solid polymer made | Grams of polymer per grams of catalyst |
| --- | --- | --- | --- | --- |
| 1 | Zirconia-silica-alumina | 9.8 | 23 | 2.3 |
| 2 | Silica-alumina | 13.3 | 8.8 | 0.66 |

The promoting effect of zirconia is readily apparent from the larger yield of polymer for each unit of catalyst, even though the operating time for the zirconia catalyst was only half as long.

Reasonable variations and modifications are possible within the scope of the disclosure of the present invention, the essence of which is the discovery that zirconium oxide associated with silica-alumina catalyzes the polymerization of ethylene to form solid polymers.

That which is claimed is:

1. A process which comprises contacting ethylene at a temperature in the range 100 to 550° F. with a catalyst active for ethylene polymerization and consisting essentially of zirconium oxide associated with a silica and alumina composite to form a normally solid polymer of ethylene.

2. A process according to claim 1 wherein the ethylene is accompanied by from 0.5 to 20 weight percent, based on total olefin, of a heavier olefin selected from the group consisting of propylene, 1-butene, 1-pentene, and 1,3-butadiene.

3. A process which comprises contacting ethylene at a temperature in the range of about 200 to about 400° F. with a catalyst active for ethylene polymerization and consisting essentially of zirconium oxide associated with a silica and alumina composite and recovering a normally solid polymer of ethylene.

4. A process which comprises contacting ethylene, in admixture with a diluent which is liquid, inert, and non-deleterious under the reaction conditions, at a temperature in the range of about 200 to about 400° F. and a pressure sufficient to maintain said diluent in the liquid phase, with a catalyst active for ethylene polymerization and consisting essentially of zirconium oxide associated with a silica and alumina composite, and recovering a normally solid polymer of ethylene.

5. A process which comprises contacting ethylene, in admixture with a diluent selected from the group consisting of paraffins and cycloparaffins under polymerization conditions, at a temperature in the range of about 200 to about 400° F. and a pressure sufficient to maintain said diluent substantially in a liquid phase, with a catalyst active for ethylene polymerization and consisting essentially of zirconium oxide associated with a silica and alumina composite, and recovering a normally solid polymer of ethylene.

6. A process which comprises contacting ethylene at a temperature in the range of about 100 to about 550° F. with a catalyst prepared by impregnating a silica-alumina composite with an aqueous solution consisting essentially of a zirconium compound calcinable to zirconium oxide, drying the resulting composite, and heating at an elevated temperature and for a sufficient time to produce a substantial activation of said catalyst for said process, and recovering a normally solid polymer of ethylene.

7. A process which comprises contacting ethylene at a temperature in the range of about 100 to about 550° F. with a catalyst prepared by impregnating a silica-aluminia composite with an aqueous solution consisting essentially of a zirconium compound calcinable to zirconium oxide, drying the resulting composite, and heating in a non-reducing atmosphere and for a sufficient time to produce a substantial activation of said catalyst for said process, and recovering a normally solid polymer of ethylene.

8. A process which comprises contacting ethylene at a temperature in the range of about 100 to about 550° F. with a catalyst prepared by impregnating a silica-alumina composite with an aqueous solution consisting essentially of a zirconium compound calcinable to zirconium oxide, drying the resulting composite, and heating in a dry oxygen-containing atmosphere for a sufficient time to produce a substantial activation of said catalyst for said process, and recovering a normally solid polymer of ethylene.

References Cited in the file of this patent

UNITED STATES PATENTS

| | | |
|---|---|---|
| 1,592,543 | Stewart | July 13, 1926 |
| 2,391,116 | Ashley | Dec. 18, 1945 |
| 2,444,913 | Bond | July 13, 1948 |
| 2,608,525 | Thomas | Aug. 26, 1952 |
| 2,727,525 | Evering et al. | Dec. 13, 1955 |
| 2,791,575 | Feller et al. | May 7, 1957 |
| 2,824,089 | Peters et al. | Feb. 18, 1958 |
| 2,825,721 | Hogan et al. | Mar. 4, 1958 |
| 2,861,983 | Fotis | Nov. 25, 1958 |

OTHER REFERENCES

Schildknecht: Vinyl and Related Polymers (1952), John Wiley and Sons, New York, New York, pages 495, 539 and 540.

Raff et al.: Polyethylene, November 19, 1956, Interscience Publishers Inc., New York, New York, page 67.